Patented Apr. 4, 1939  2,153,316

UNITED STATES PATENT OFFICE 2,153,316

METHOD FOR THE PRODUCTION OF PLASTICS

Earl C. Sherrard, Edward Beglinger, and John P. Hohf, Madison, and Ernest Bateman, deceased, late of Madison, Wis., by William T. Bateman, Madison, Wis., special administrator, assignors to Henry A. Wallace, Secretary of Agriculture of the United States of America, and his successors in office No Drawing. Application January 28, 1938, Serial No. 187,565

6 Claims. (Cl. 260—9)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to methods of treating vegetable fibrous material, such as wood and bagasse, for the preparation of plastics.

In a United States Patent No. 1,932,255 granted to Earl C. Sherrard and Edward Beglinger, there is disclosed a process of molding ligno-cellulose containing a suitable plasticizer, such as furfural. Our present invention relates to improvements on the process therein disclosed, particularly to the pretreatment of vegetable fibrous material, whereby the ratio of lignin to hydrolyzed cellulose in the final product may be controlled. By controlling such ratio, products may be obtained by molding the resulting hydrolyzed ligno-cellulose which possess desired properties. We have found that the ratio of lignin to hydrolyzed cellulose can be varied through wide limits by properly controlling the conditions of cooking. We preferably cook the wood or other vegetable fibrous material in an acid bath, and by regulating the acid concentration, steam pressure or time of cooking, the ratio of lignin in the resulting hydrolyzed ligno-cellulose can be controlled.

We have further found that the ratio of lignin to hydrolyzed cellulose determines the properties of the finished molded material. The use to which the product is to be put is therefore determinative of the conditions under which the wood or other material should be cooked. Where mild cooking conditions are employed, the ratio of lignin to hydrolyzed cellullose is low; where drastic conditions are employed, the ratio of lignin is high. The use of the product to be made from the molded material therefore determines the cooking conditions because a material having a low ratio of lignin to hydrolyzed cellulose has high strength values and low water resistance, while in the case of a high ratio of lignin, lower strength values are obtained with a greater water resistance.

In determining the conditions under which the woody material should be cooked, the lignin may be considered the moldable component of the hydrolyzed ligno-cellulose complex. While lignin is moldable, when it is molded alone, it has a tendency to sinter upon removal from the mold with a consequent loss of strength. The addition of certain plasticizers improves the moldability of lignin, not only by making it more plastic but by eliminating the tendency to sinter and by greatly adding to the strength values of finished molded products. The strength values, however, are also enhanced by the presence of hydrolyzed cellulose, and our present invention is particularly adapted to the regulation and control of the ratio of lignin to hydrolyzed cellulose whereby desired strength values in the molded product are obtained. As stated, the material to be employed is cooked in an acid bath, which results in rendering soluble the easily hydrolyzed related cellulose complexes whose presence in the molded products lowers the quality thereof. While wood and similar vegetable fibrous materials have been cooked in the past for the purpose of removing these related cellulose complexes, our invention is an improvement over the prior practices in that the cooking not only results in the removal of these related cellulose complexes but also is regulated to control the ratio of lignin to hydrolyzed cellulose.

In carrying out our invention, the woody material, in a suitably sub-divided condition, is cooked in the presence of an acid and at a selected steam pressure for the purpose of producing a moldable material having a desired ratio of lignin to hydrolyzed cellulose. The cooking pressure, acid concentration and time of cook may be varied to obtain the desired end product. As examples of variations that alter the ratio of lignin to hydrolyzed cellulose and the modulus of rupture of the resulting product, the following table is given:

| Steam gauge pressure | | Sulphuric acid concentration (based on dry weight of the wood) | | | | | | |
|---|---|---|---|---|---|---|---|---|
| | | 1% acid | 2% acid | 3% acid | 4% acid | 5% acid | 6% acid | 7% acid |
| Lbs. per sq. in. 120 | Cellulose | % 63 | % 62 | % 60 | % 57 | % 56 | % ----- | % 52 |
| | Lignin | 33 | 36 | 38 | 40 | 42 | ----- | 47 |
| | Modulus of rupture | 7000 | 6300 | 5200 | 4300 | 5000 | ----- | 3600 |
| 135 | Cellulose | 66 | 63 | 61 | 58 | 55 | 54 | 50 |
| | Lignin | 33 | 37 | 39 | 41 | 45 | 45 | 50 |
| | Modulus of rupture | 8000 | 6200 | 5800 | 5200 | 5100 | 4500 | 4600 |
| 150 | Cellulose | 65 | 62 | 58 | 55 | 52 | 49 | 43 |
| | Lignin | 35 | 38 | 41 | 45 | 47 | 51 | 58 |
| | Modulus of rupture | 7500 | 6600 | 5300 | 5200 | 5000 | 4100 | 3600 |

In each of the examples given the time of cook was substantially 30 minutes. By varying this time the percent of lignin may also be regulated, that is, for a given acid concentration and for a given steam pressure the percentage of lignin may be increased by increasing the time of cook. This table shows the results of changing two of the variables of hydrolysis: temperature (steam pressure) and acid concentration, the time and kind of acid remaining constant. It shows the definite relationship between the cellulose-lignin ratio and the severity of the hydrolysis and, in turn, the relationship between cellulose-lignin ratio and modulus of rupture; for example, cellulose-lignin ratios of 62:36, 63:37, and 62:38 had modulus of ruptures of 6300, 6200, 6600, respectively, which are well within experimental error, since we were equipped to make our tests only on small pieces of 2 inches by 1 inch by $\frac{3}{32}$ inch.

From the foregoing table it will be seen that where high strength values are desired, the acid concentration is low, and the cooking conditions are mild. The figures given are for sulphuric acid, and it is preferably diluted with approximately 2½ parts of water, based upon the dry weight of the wood substance, exclusive of moisture. We have found that other acids may be used such as, for example, hydrochloric acid, phosphoric acid, acetic acid, and oxalic acid, etc. If high water resistance in the finished material is desired, more drastic conditions of hydrolysis must be applied, such as the use of 150 to 160 pounds steam pressure, and/or higher acid concentration and/or longer cooking times. The above table is not intended to cover all variations in our process, it being set forth merely by way of illustration of the variations of lignin-cellulose ratios produced by variations in the conditions of hydrolysis.

Our invention is not limited to any set conditions of acid concentration, steam pressure, or time of cooking, the invention residing in the selection of a set of conditions that will produce the desired ratio of lignin to cellulose, and therefore produce the desired properties in the final product. It will be apparent that changes in the acid concentration can be compensated for by changing one of the other variables, such as steam pressure, or time of cooking, or both.

By way of illustration in the practising of our invention, the following examples are given:

*Example 1.*—To substantially 100 parts of dry vegetable fibrous material we may add about 250 parts of water and approximately 1 part of sulphuric acid. This mixture is then heated in a digester under a steam pressure of substantially 120 pounds per square inch for about 30 minutes. The resulting material is then copiously washed with water so as to remove the acid and water-soluble reaction products. The remaining material is then subjected to the action of heat and ground to a powder. To 100 parts of the resulting hydrolyzed ground material we may add substantially 8 parts of aniline and 8 parts of furfural, allowing the mixture to season for 24 hours, or more. The resulting plasticized material, when molded under heat (150° C.) and pressure ranging from 1500 to 3500 pounds per square inch, has a modulus of rupture of about 7000 pounds per square inch.

*Example 2.*—To substantially 100 parts of dry vegetable fibrous material we may add about 250 parts of water and approximately 7 parts of sulphuric acid. This mixture is then heated in a digester under a steam pressure of substantially 150 pounds per square inch for about 30 minutes. The resulting material is then copiously washed with water so as to remove the acid and water-soluble reaction products. The remaining material is then subjected to the action of heat and ground to a powder. To 100 parts of the resulting hydolyzed ground material we may add substantially 8 parts of aniline and 8 parts of furfural, allowing the mixture to season for 24 hours or longer. The resulting plasticized material, when molded under heat (150° C.) and pressure ranging from 1500 to 3500 pounds per square inch, has a modulus of rupture of about 3600 pounds per square inch.

From the foregoing it will be seen that by practicing our invention, between the limits of lower percentage of acid, and pressure used, to a higher percentage of acid, and pressure, as set forth by Example 2, plastics of varying strengths may be obtained as more fully shown by the foregoing table.

In some instances, it may be found desirable to eliminate the washing of the hydrolyzed material, merely draining free of the cooking liquors before drying and grinding. This results in leaving a trace of residual acid in the hydrolyzed ligno-cellulose, which may be advantageous in catalyzing the polymerization of certain plasticizers, such as furfural and aniline.

After cooking, the material is washed with warm water to remove the remaining acid, and the resulting soluble products of hydrolysis. It is then dried and ground to a suitable fineness for molding.

In molding, a suitable plasticizer is added, which may be furfural in accordance with the disclosure of United States Patent No. 1,932,255. We preferably, however, employ a mixture of substantially 8 parts aniline and 8 parts furfural to substantially 100 parts of hydrolyzed ligno-cellulose. The material is seasoned for 24 to 48 hours and may then be pressed to a desired shape, by subjecting it to the action of heat, and pressure for from 2 to 10 minutes. The time and pressure employed in molding may, of course, be varied according to the density desired in the final product.

In lieu of the plasticizers mentioned, others may be employed and the choice is determined, to some extent, by the conditions applied during the cooking process. For example, the mixture of furfural and aniline suggested above may be employed for plasticizing a hydrolyzed ligno-cellulose material that has been produced by cooking wood at substantially 135 pounds steam pressure for about 30 minutes in the presence of approximately 1 percent of acid. Other plasticizers, however, will be found more suitable for plasticizing hydrolyzed ligno-cellulose that is richer in lignin and has a lower hydrolyzed cellulose content. For such purposes we may employ phthalates, such as phthalic anhydride, butyl phthalate or mixtures of phthalates and a phenol.

Having thus described our invention, what we claim for Letters Patent is:

1. A process for producing a moldable hydrolyzed vegetable fibrous material, in which the desired cellulose-lignin ratio is obtained, which comprises hydrolyzing the vegetable fibrous material with substantially 2 parts of acid and substantially 250 parts of water per 100 parts of vegetable fibrous material under controlled conditions of steam pressure and time of hydrolysis, thereby producing a material having the properties of plastic flow and maximum tensile strength when subjected to heat and pressure.

2. A product prepared as in claim 1, consisting of hydrolyzed vegetable fibrous material of maximum cellulose content, and having the properties of plastic flow and maximum tensile strength when subjected to heat and pressure.

3. A process for producing a moldable hydrolyzed vegetable fibrous material, in which the desired cellulose-lignin ratio is obtained, which comprises hydrolyzing the vegetable fibrous material with substantially 5 parts of acid and substantially 250 parts of water per 100 parts of vegetable fibrous material under controlled conditions of steam pressure and time of hydrolysis, thereby producing a material having the properties of plastic flow and maximum water resistance when subjected to heat and pressure.

4. A product prepared as in claim 3, consisting of hydrolyzed vegetable fibrous material of maximum lignin content, and having the properties of plastic flow and maximum water resistance when subjected to heat and pressure.

5. A product prepared as in claim 1, consisting of hydrolyzed vegetable fibrous material, and having moldable properties, with a plasticizer added.

6. A product prepared as in claim 3, consisting of hydrolyzed vegetable fibrous material, and having moldable properties, with a plasticizer added.

EARL C. SHERRARD.
EDWARD BEGLINGER.
JOHN P. HOHF.
WILLIAM T. BATEMAN,
Special Adminstrator of Ernest Bateman, Deceased.